United States Patent Office 3,554,761
Patented Jan. 12, 1971

3,554,761
COFFEE CONCENTRATE AND PROCESS OF PRODUCING THE SAME
Robert J. Carbonell, Stamford, Conn., assignor to Standard Brands Incorporated, New York, N.Y., a corporation of Delaware
No Drawing. Filed Feb. 7, 1968, Ser. No. 707,366
Int. Cl. A23f 1/08, 3/02
U.S. Cl. 99—71                                                         11 Claims

ABSTRACT OF THE DISCLOSURE

A method of producing an instant coffee which when reconstituted in hot water has substantially the flavor and aroma of freshly brewed coffee. Ground, roasted coffee is subjected to a flavor and aroma extraction process and the flavor and aroma constituents collected. A sufficient amount of coffee solids, for instance spray dried coffee, is mixed with suitable proportions of the flavor and aroma constituents to obtain an aqueous mixture having a solids concentration of above about 20 percent by weight. This mixture is freeze dried and mixed in suitable proportions with a dried instant coffee in order to obtain an instant coffee which when reconstituted in hot water has substantially the flavor and aroma of freshly brewed, ground, roasted coffee.

---

This invention relates to an improved process for the preparation of dried, water soluble coffee concentrates which when reconstituted in hot water, have substantially the flavor and aroma of freshly brewed, ground, roasted coffee.

Many attempts have been made in the past to produce dried, water soluble coffee concentrates, hereinafter termed "instant coffee," which when reconstituted in hot water have substantially the flavor and aroma of freshly brewed or percolated coffee. These attempts have resulted in instant coffees, but such coffees do not have the flavor or aroma of freshly brewed, ground, roasted coffee.

In the preparation of instant coffee, two general approaches have been taken. The first approach, and the one principally being used today, is to prepare a coffee extract by extracting ground, roasted coffee with hot water, and then drying the extract by the application of heat thereto, for instance by spray drying. Spray drying is usually carried out at relatively high temperatures which cause rapid evaporation of the moisture from the coffee extract. This procedure is economical and has found large-scale commercial utility. However, due to the high temperatures employed many of the desired volatile aroma and flavor constituents of the coffee extract are lost and undesirable caramel-like flavors are imparted to the dried coffee. Also, in the preparation of the coffee extract some of these desired volatile constituents seem to be degraded due to the vigorous conditions under which the extraction process is carried out. For these reasons, various techniques have been devised to remove certain of the desired volatile constituents from the roasted coffee particles prior to the extraction thereof. These techniques include expressing a portion of the roasted coffee in order to remove various oily constituents therefrom, commonly termed "aroma oil," and plating them onto instant coffee. Other techniques include steam treating a portion of the roasted coffee by various means to provide a steam distillate, collecting the steam distillate, incorporating it into a coffee extract and spray drying the coffee extract.

The other general approach that has been taken to produce instant coffee is to freeze dry a coffee extract. Freeze dried instant coffee is generally considered to be superior in flavor to spray dried instant coffee, and is closer to freshly brewed, ground, roasted coffee in terms of flavor quality. This is due to the absence of the caramel-like flavors typical of coffee which has been dried at relatively high temperatures and the fact that lesser amounts of the volatile flavor constituents contained in the extract are lost in drying due to the low temperatures employed. However, even in such a process, fairly significant quantities of these volatile flavor constituents are lost. Moreover, even though freeze drying provides the advantage of producing an instant coffee which is more like freshly brewed or percolated coffee than is spray dried instant coffee, there are significant economic disadvantages associated therewith. These include the high cost of the equipment, the maintenance thereof, and the cost and the length of time necessary to sublimate the water from the frozen coffee extract.

Accordingly, it is the principal object of the present invention to provide an economical process for producing an instant coffee which when reconstituted in hot water has superior flavor and aroma characteristics.

A further object of the present invention is to provide a process for producing an instant coffee which when reconstituted with hot water has substantially all of the flavor and aroma characteristics of freshly brewed, ground, roasted coffee.

Broadly, these objects, and others, are attained in accordance with the present invention by subjecting ground, roasted coffee to a flavor and aroma extraction process, collecting the extracted flavor and aroma, and mixing the extracted flavor and aroma with coffee solids to provide an aqueous mixture having a solids concentration of above about 20 percent by weight, freeze drying the aqueous mixture, mixing sufficient amounts of the freeze dried aqueous mixture with an instant coffee to impart thereto, when reconstituted in hot water, substantially the flavor and aroma of freshly brewed, ground, roasted coffee.

The flavor and aroma extraction process most preferred for use in the present invention is a steam distillation process. Steam distillation of ground, roasted coffee may be performed under a variety of conditions known in the art. One common method comprises providing a vertical column of ground, roasted coffee, introducing steam into the bottom of the column and collecting the steam distillate in the form of a condensate. The particle size of the ground, roasted coffee is not critical in such a process. However, since it is the general practice to water extract the coffee after it is subjected to steam distillation, the coffee particles should not be of the size which would significantly impede the flow of water therethrough. Typically, the size of the ground coffee particles will be such that substantially all of the particles will be retained on an 8 mesh screen.

Although steaming of the coffee may be performed under a variety of conditions and satisfactory condensates obtained, the preferred condensates are obtained when saturated steam is used and at least a major portion of the coffee particles are wetted prior to the steaming thereof. The most preferred condensates are obtained when sufficient water is added to the column so that substantially all of the coffee particles are wetted prior to the steaming thereof, and an excess of unabsorbed free water is present in at least the lower portion of the column. Under such conditions, when steaming is initiated the steam initially contacts the admixture of coffee particles and free water and causes immediate commencement of percolation and refluxing to extract flavor and aroma constitutents.

The preferred condensates are obtained by introducing steam into the bottom of a column of ground, roasted coffee at a controlled rate of from about 0.05 to about 0.30 pound of steam per pound of coffee per hour and preferably 0.1 to 0.15 pound of steam per pound of coffee per hour when the height to width ratio of the column is from about 8:1 to about 2.5:1. Most preferably, steam is introduced at about 0.125 pound of steam per pound of coffee per hour when the height to width ratio of the column is in the range of from about 5:1 to about 7:1. Steam is introduced under sufficient pressure to permit an upward flow of vapors through the column at the steam flow rates hereinbefore specified. Generally, steam pressures of 5 to 25 p.s.i.g. in the steam feed line at the column will be adequate. Under these steaming conditions, steaming is matintained until from about 25 to about 45 milliliters of condensate are obtained per pound of coffee present in the column, and preferably about 33 to 39 milliliters of condensate per pound of coffee are collected. Preferably, steaming of the coffee under the aforementioned conditions is carried out for from about 30 to 90 minutes, and most preferably for about 60 minutes.

The steam volatiles or distillate are collected by the condensation thereof at temperatures of from about 35° F. to 212° F. When it is desired to collect volatiles which may not condense at about 35° F., it is possible to use a cold finger auxiliary condenser at about −50° F. or lower.

Preferably, however, the steam distillate is collected within two separate temperature ranges. This may be accomplished by providing two condensers maintained at different condensing temperatures. The first condenser will have condenser surface areas and will be maintained with surface temperatures such that at a given vapor velocity a major portion of the total steam distillate produced will be condensed therein and the second condenser will have condenser surface areas and will be maintained with lower surface temperatures such that at a given vapor velocity substantially all of the remaining portion of the total steam distillate is condensed therein. Preferably about two-thirds of the total steam distillate will be collected by use of the first condenser and one-third by use of the second condenser.

The steam distillate exiting from the column of coffee is preferably passed through a first condenser to condense distillate at a temperature in the range of from about 185° F. to about 212° F. The distillate exiting from this condenser is then passed through the second condenser which is cooled sufficiently so that the condensate is collected at a temperature in the range of from about 35° F. to about 70° F. The volatile materials condensed at these two temperature ranges are termed "hot condensate" and "cold condensate," respectively. Generally, the hot condensate will contain higher boiling flavor and aroma constituents which contribute body and acidity and the cold condensate will contain delicate, highly volatile constituents characteristic of brewed cup aroma and flavor.

Various levels of the hot and cold condensates can be utilized depending on the flavor and aroma effect desired. Preferably, levels of use of distillate from the hot condenser and the cold condenser are in a ratio of hot condensate to cold condensate of 0.5:1 to 1.5:1 and most preferably at a ratio of 1:1. Very satisfactory results are obtained by utilizing one-half of the hot condensate with all of the cold condensate. Thus, in order to obtain the desired flavor balance, between one-fourth and three-fourths of the hot condensate is discarded and the balance combined with the total cold condensate collected.

Generally, the hot condensate will be immediately cooled to below about 70° F. and preferably to about 35° F. to 50° F. If the hot condensate temperature is not reduced, significant losses of the desired constituents will occur due to volatilization and heat degradation. When the condensates obtained from the two condensers are not utilized shortly after being prepared, it is preferred that they be frozen and stored in glass or stainless steel under a carbon dioxide or nitrogen atmosphere to preserve the product quality.

In addition to the use of steam distillate as hereinbefore described, other coffee flavors and aromas obtained by a variety of processes well known to those skilled in the art may be used.

Extraction of the steamed, ground, roasted coffee may be accomplished by any of the techniques well known in the art. Preferably, the extractor containing the steamed coffee is connected into a countercurrent extraction battery such as is generally used in commercial high-pressure coffee extraction. The steamed coffee column takes the place of the fresh coffee stage in the normal countercurrent operation. Extract from the previous stage flows through the steamed coffee and a suitable draw-off is taken to obtain the desired yield. If desired, the extract pH may be adjusted so that when the dried extract is reconstituted in hot water and cream added, "feathering" of cream will be avoided. The extract may be clarified to remove coffee fines and then dried by any of the conventional coffee dehydration techniques, although for most purposes, spray drying will be the preferred means of dehydration.

In the preferred process of the present invention, it is not necessary that the condensates isolated from the ground, roasted coffee be added to the instant coffee in stoichiometric quantities. Only a portion of the total coffee which is to be extracted is subjected to steam distillation as the condensates collected are so flavorful that they will provide the desired flavor for a much larger quantity of instant coffee than will steam volatiles obtained by conventional steam distillation as practiced in the past.

The aforesaid proportions of the hot and cold condensates are mixed with coffee solids to provide an aqueous mixture containing above about 20 percent by weight of coffee solids and the mixture frozen to provide a suitable feed for freeze drying. This results in a mixture wherein the proportion of desired volatiles to water is high. Following this general procedure will result in a freeze dried material which is much more flavorful than a freeze dried material prepared from an aqueous mixture having a smaller proportion of volatiles to water and a low solids concentration. If the desired volatiles concentration and the solids concentration are relatively high in the aqueous mixture, lesser amounts of the volatiles are lost during freeze drying than would be the case if such concentrations were lower. In conventional freeze drying processes, the proportion of desired volatiles to water is considerably lower than in the process of the present invention and, consequently, significant losses of volatiles are incurred, although not to be the extent that would be incurred by other conventional methods of drying. The desired volatiles are not extremely volatile per se, but in the presence of water they volatilize or co-sublime quite easily. During freeze drying the sublimed water vapor carries with it some of the desired volatiles because of the affinity that water vapor has for these volatiles. When the proportion of volatiles to water in the freeze dryer feed is increased lesser amounts of the desired volatiles are lost.

The solids concentration of the freeze dryer feed plays an important role in reducing the degradation of the desired flavor and aroma quality during feed preparation and freeze drying. In order to provide maximum retention of the desired flavor and aroma constituents, the requisite level of coffee solids should be added to the distillates as soon as possible after collection since these desired constituents have a tendency to degrade if not protected. In order to reduce the degree of degradation of the flavor and aroma constituents, the solids concentration in the freeze dryer feed should be maintained at a level of above about 20 percent by weight. Preferably, the soluble solids will be at a concentration of from about 20 percent to about 45 percent by weight. At solids concentrations of above about 45 percent by weight, no further benefits are generally obtained and limitations of equipment capabilities make such higher concentrations of solids impractical.

Various methods are included within the scope of the present invention in order to obtain a freeze dryer feed having a high ratio of desired volatiles to water and above about 20 percent by weight coffee solids. In the present invention, to obtain the desired solids concentration in the freeze dryer feed, a portion of the total solids must be provided by the addition of instant coffee. For instance, suitable proportions of hot and cold condensates may be mixed with spray dried coffee to obtain the desired solids concentration.

Another embodiment of the present invention with respect to the preparation of the freeze dryer feed comprises the addition of suitable proportions of freeze concentrated coffee extract and instant coffee to the desired steam distillate or other flavor components to be utilized. The freeze concentrated extract may be prepared by well known prior art techniques. Such freeze concentrated extract may be utilized at solids concentration levels of from 25 to 45 percent. Typically, freeze concentrated extract at a concentration of about 40 percent coffee solids may be added to condensate at a ratio of about 0.7:1 to about 2.5:1. Spray dried instant coffee will be added to the mixture at a ratio of spray dried coffee solids to condensate of about 0.1:1 to about 0.5:1 in order to provide a 30 percent solids freeze dryer feed.

It has been found that the use of freeze concentrated coffee extract permits the attainment of a product with substantially better quality than would be obtained solely by addition of spray dried coffee to the condensate prior to freeze drying. This result is due to the fact that the solids in the freeze concentrate have not been subjected to the degrading heat conditions to which coffee solids are subjected during spray drying.

The freeze dryer feed may be prepared by mixing coffee solids with the condensates by any conventional mixing means capable of providing a homogeneous feed without damaging quality. The freeze dryer feed may be frozen and freeze dried by methods well known in the art.

As the product obtained from the freeze dryer feed is to be used in only a small proportion of the total weight of the instant coffee product, there is no requirement that careful control of freezing conditions be maintained such as would be required in preparing a freeze dried instant coffee where powder color and bulk densities are of great importance. This permits the use of any conventional freezing techniques such as tray freezing, blast freezing, belt freezing, etc.

The frozen freeze dryer feed may be freeze dried in slab or particulated granular form, although the granular form is preferred. The freeze drying of the granular material provides a product with superior flavor and aroma qualities. The freeze dried product is the incorporated into spray dried instant coffee. Preferably, the freeze dried product is incorporated into spray dried coffee at levels in the range of from about 2.5 to about 8.0 percent and most preferably at about 2.5 to 3.5 percent by weight when no freeze concentrated extract is used, and from about 5.0 to 8.0 percent when freeze concentrated extract is used. The freeze dried product is incorporated into the spray dried powder by grinding to a compatible particle size range and then blending to obtain a homogeneous mixture. If desired such product may then be aromatized by any of the conventional prior art methods.

The storage stability of this product is superior to freeze dried coffee maintained under comparable storage conditions.

While process of the present invention has been described with respect to the treatment of coffee, it is also contemplated that the invention may be used to provide an instant tea which when reconstituted in hot water will have the flavor and aroma of freshly brewed tea. For instance, dried tea leaves or a water extract of tea leaves may be subjected to flavor and aroma extraction process such as described in U.S. Pat. 3,163,539. The flavor and aroma extracted from tea leaves may then be incorporated into instant tea solids at levels hereinbefore described with respect to coffee. This mixture may be treated and incorporated into instant tea also as hereinbefore described. The levels of flavor and aroma utilized in the case of tea may vary somewhat depending upon the particular flavor and aroma desired. The range of tea flavors and aromas are far greater than the range found in coffee.

The invention is illustrated by the following specific examples. In these examples and throughout the specification, all percentages are by weight and unless otherwise stated, are based on the dry substance weight of the coffee extract.

EXAMPLE I

Approximately 1,500 pounds of roasted and ground coffee having a particle size of about 8 mesh was introduced to fill a stainless steel, high-pressure extraction column. The column was about 200 inches high and 32 inches in diameter. Thirty gallons of water was added to the top of the column to prewet the coffee and provide an excess of unabsorbed free water at the bottom of the column. Saturated steam was introduced at the bottom of the column. The steam was at a pressure of about 5 p.s.i.g. measured in the steam feed line at the column and had a flow rate of about 190 lbs./hour. The coffee was steamed for about 60 minutes. The volatiles started to exit from the column in 20 to 30 minutes, and were condensed in two condensers connected in series. The first condenser was of a shell-and-tube type, having 47 square feet of surface, cooled by circulating water at about 201° F. The second condenser was of a similar type and size as the first condenser, but was cooled by circulating glycol at about 40° F. which was sufficient to condense substantially all of the remaining vapors that were produced during the steaming operation. The distillate condensed in the first condenser was further cooled to a temperature of about 50° F. using a subcooler. The distillate obtained with the second condenser had a temperature of about 50° F. when it was collected.

After steaming, the extractor containing the steamed coffee was connected in series as a fresh coffee stage of a standard counter-current high-pressure extraction battery, wherein it was extracted in the usual fashion. About 3,200 pounds of extract was collected, having a solids concentration of about 18% and an extraction yield of about 38% based on the weight of roasted and ground coffee charged. The pH of this extract was adjusted to about 4.8 by the addition of about 1,500 ml. of a 45 percent solution of potassium hydroxide. This exract was sprayed dried in a conventional manner.

The first condenser yielded about 100 pounds of hot condensate and the second condenser yielded about 40 pounds of cold condensate. All the cold condensate was combined with sufficient hot condensate to provide a total condensate weight of 80 pounds. The condensates and sufficient spray dried coffee to provide a 30 percent solids concentration therein were mixed in a ribbon mixer. The The aqueous mixture was frozen, particulated and freeze dried in the conventional manner. The freeze dried material was then incorporated into the spray dried coffee at a level of 2.78 percent by weight.

The resultant product appeared to have captured substantially all of the delicate flavor and aroma of freshly percolated coffee. The cup strength of the product when reconstituted in hot water was greater than that obtained when an equal weight of commercially available spray dried instant coffee was reconstituted.

EXAMPLE II

The process set forth in Example I may also be carried out by mixing 100 pounds of freeze concentrated coffee extract containing 40 percent coffee solids with 80 pounds of the total condensate mixture obtained in Example I, adding 20 pounds of spray dried coffee solids in order to provide a freeze dryer feed having 30 percent solids concentration.

The mixture is then frozen, particulated and freeze dried as in Example I and incorporated into spray dried instant coffee at a level of about 6 percent by weight.

The finished product was superior in flavor quality to that obtained in Example I.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A process for preparing an instant coffee which when reconstituted in hot water has substantially the flavor and aroma of freshly brewed, ground, roasted coffee comprising subjecting ground, roasted coffee particles to steam distillation, collecting the steam distillate at a temperature in the range of from about 35° to 212° F., mixing the steam distillate with soluble coffee solids, at least a portion of which is spray dried coffee, to provide an aqueous mixture having a coffee solids concentration of above about 20 percent by weight, freeze drying the aqueous mixture and mixing the freeze dried mixture with a spray dried instant coffee to obtain therein a level of the freeze dried mixture of from about 2.5 to about 8 percent by weight.

2. A process for preparing an instant coffee as defined in claim 1, wherein prior to the steam distillation at least a major portion of the ground, roasted coffee is wetted.

3. A process for preparing an instant coffee as defined in claim 2, wherein a column of wet ground, roasted coffee particles is subjected to steam distillation.

4. A process for preparing an instant coffee as defined in claim 3, wherein prior to steam distillation sufficient moisture is added to the column of ground, roasted coffee particles to thoroughly wet the same and to provide an excess of unabsorbed free water in the lower portion of the column, and steam distillation is performed by the use of saturated steam.

5. A process for preparing an instant coffee as defined in claim 4, wherein the height to width ratio of the column of ground, roasted coffee is from about 8:1 to about 2.5:1.

6. A process for preparing an instant coffee as defined in claim 5, wherein the distillate is condensed within two temperature ranges, the first temperature range being from about 185° to about 212° F., wherein a hot condensate is collected, and the second temperature range being from about 35° to about 70° F., wherein a cold condensate is collected.

7. A process for preparing an instant coffee as defined in claim 6, wherein the distillate used to prepare the aqueous mixture is a mixture of hot condensate and cold condensate in the ratio of from about 0.5:1 to about 1.5:1, respectively.

8. A process for preparing an instant coffee as defined in claim 7, wherein the aqueous mixture has a soluble coffee solids concentration of from about 20 to about 45 percent by weight.

9. A process for preparing an instant coffee as defined in claim 8, wherein the soluble coffee solids concentration of the aqueous mixture is provided by the addition of suitable proportions of spray dried instant coffee to the condensates.

10. A process for preparing an instant coffee as defined in claim 9, wherein the soluble coffee solids concentration of the aqueous mixture is provided by suitable proportions of a freeze concentrated coffee extract and a spray dried instant coffee.

11. A process for preparing an instant tea comprising subjecting dried tea to steam distillation, collecting the steam distillate at a temperature in the range of from about 35° to about 212° F., mixing the steam distillate with soluble tea solids, at least a portion of which is spray dried tea, to provide an aqueous mixture having a tea solids concentration of about above 20 percent by weight, freeze drying the aqueous mixture and mixing the freeze dried mixture with a spray dried instant tea to obtain therein a level of the freeze dried mixture of from about 2.5 to about 8 percent by weight.

References Cited

UNITED STATES PATENTS

| | | | |
|---|---|---|---|
| 3,244,531 | 4/1966 | Clinton et al. | 99—71 |
| 3,244,533 | 4/1966 | Clinton et al. | 99—71 |
| 3,406,074 | 10/1968 | Klein et al. | 99—71 |
| 3,438,784 | 4/1969 | Clinton et al. | 99—71 |

FRANK W. LUTTER, Primary Examiner

W. L. MENTLIK, Assistant Examiner

U.S. Cl. X.R.

99—77